Dec. 3, 1968 M. D. KNOX 3,414,773
AUTOMATIC RELAY CARRIER CIRCUITRY FOR TESTING MULTIPLE
TERMINAL POINTS EMPLOYING TIMER SAMPLING MEANS
Filed Aug. 25, 1966 5 Sheets-Sheet 1

INVENTOR.
MARION D. KNOX
BY
Dunlap and Laney
ATTORNEYS

INVENTOR.
MARION D. KNOX
BY
ATTORNEYS

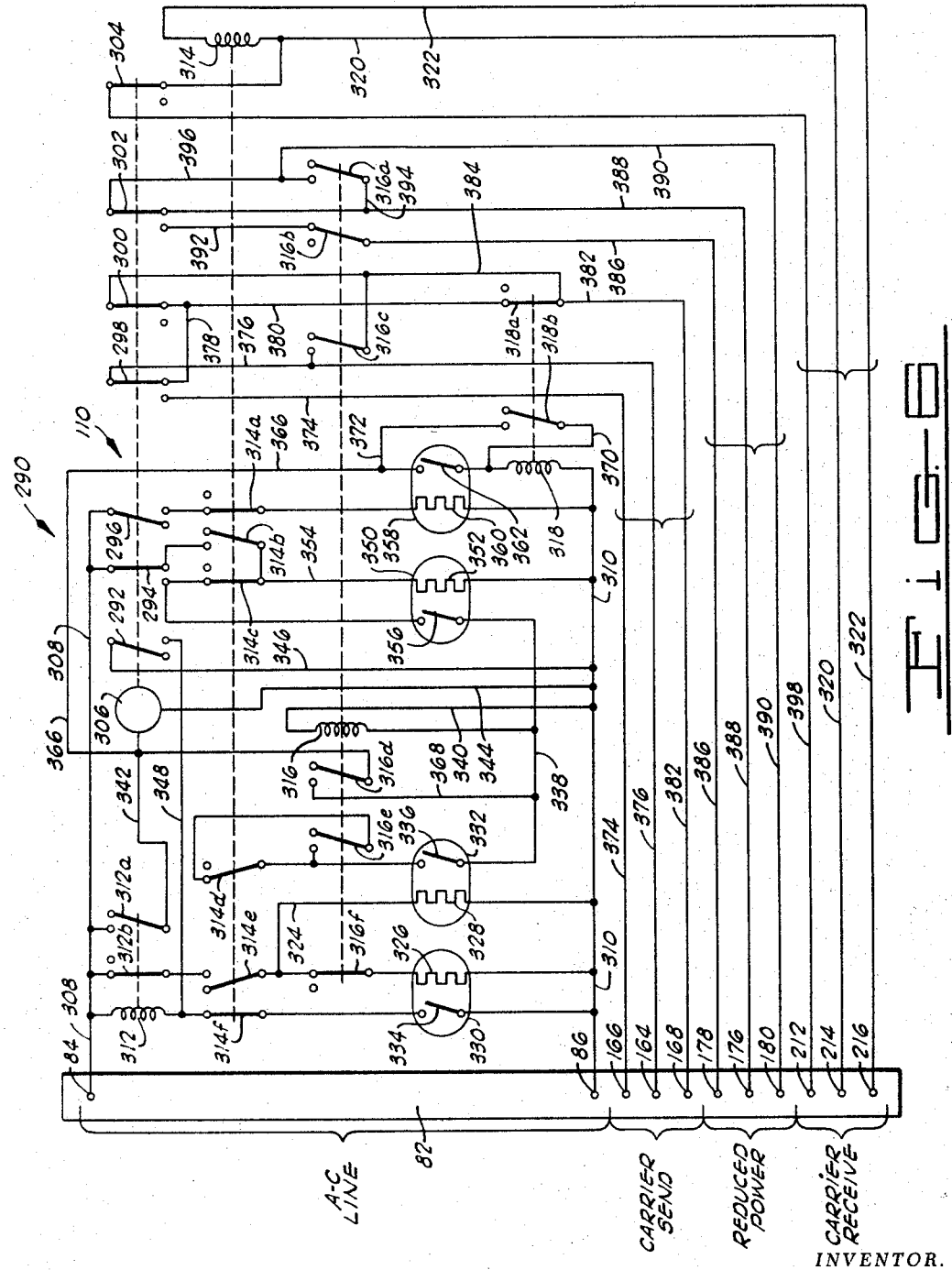

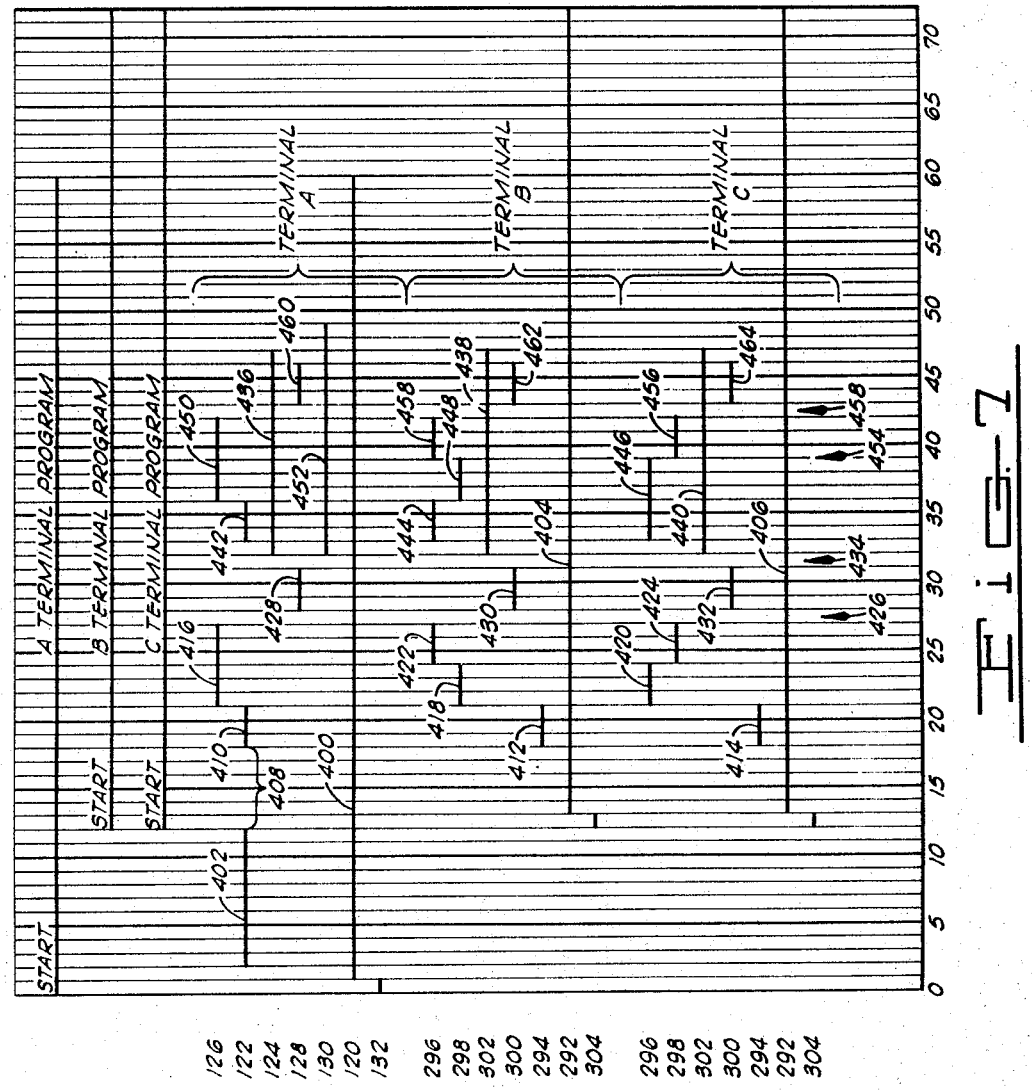

United States Patent Office 3,414,773
Patented Dec. 3, 1968

3,414,773
AUTOMATIC RELAY CARRIER CIRCUITRY FOR TESTING MULTIPLE TERMINAL POINTS EMPLOYING TIMER SAMPLING MEANS
Marion D. Knox, Edmond, Okla., assignor to Wayne Electronic Products Company, Oklahoma City, Okla., a corporation of Oklahoma
Filed Aug. 25, 1966, Ser. No. 575,033
16 Claims. (Cl. 317—28)

This invention relates to improvements in the art of testing high voltage transmission line protective relay systems and, more particularly, but not by way of limitation, it relates to a method and apparatus for automatically testing carrier-current actuated directional-relay systems.

Heretofore, the testing of protection systems for high voltage transmission networks has been carried out manually by the performance of prescribed operator manipulations and observation of readings. In the case of protective relay systems which include carrier-current equipment, it has been the general practice to make over-all carrier transmission tests at certain intervals, for example, once per day. Accomplishing this required that an operator at each terminal station send and receive a signal and that he thereafter log the pertinent findings as read from the receiver equipment, i.e., the normal and the reserve-signal or reduced power values received.

The apparatus of the present invention automatically enables, periodically, the complete tests of each carrier equipment at each transmission network terminal point. That is, the carrier equipment employed at each network terminal for protective relay control is tested for all modes of operation, at full and reduced power, and in relation to all other carrier equipment connected in the operating system. Such a testing system can be periodically enabled to carry out its test function in conjunction with attendant, alarm and corrective equipment and without the need for operator attendance.

The present invention contemplates carrier equipment testing apparatus which can be installed at each terminal of a high voltage transmission network to carry out periodic checks upon the protective relay system by means of a programmed sequence of carrier transmission and reception checks between two or three terminal installations. In a more limited aspect, the testing apparatus or system is comprised of a plurality of basic switching systems, each controlled by a periodically actuated programmed switch to control the functions of a terminal carrier equipment. Thus, at each terminal in the protective relay system, two or three terminals or transmission line substations being the normal situation, one of the programmed switching devices is installed to control transmission, reception, reduced-power reception, etc., of the respective carrier equipment. One terminal of the system is maintained as a master or starting terminal A while remaining terminals B and, if employed, terminal C are comprised of slaved programmed switch devices which operate in response to and in synchronism with the terminal A master device.

Therefore, it is an object of the present invention to provide an automatic relay carrier tester which can test either two or three terminal relay carrier systems daily.

It is a further object of the present invention to provide a tester for application with a directional comparison, three terminal line wherein each terminal can send and receive carrier with the remaining two terminals on both full power and reduced power, carrier receipt failures being indicated by particular alarms.

It is also an object of the invention to provide an automatic relay carrier tester which is programmed for daily actuation and testing of all modes of operation of a directional-relay carrier equipment which functions as a part of a protective relay system for high voltage transmission lines.

Finally, it is an object of the present invention to provide an automatic relay carrier tester which can be programmed in any of various modes of operation either two or three terminal, each of which serves to carry out the proper number of carrier tests as to transmission and reception, at full power as well as at reduced power.

Other objects and advantages of the invention will be evident from the following detailed description when read in conjunction with the accompanying drawings which illustrate the invention.

In the drawings:

FIG. 6 is a schematic diagram of the slaved or terminal B (and, if employed, terminal C) automatic relay carrier tester chassis; and FIG. 7 is a time plot of program switch sequencing for each terminal in a representative three-terminal testing system.

Figure 1:
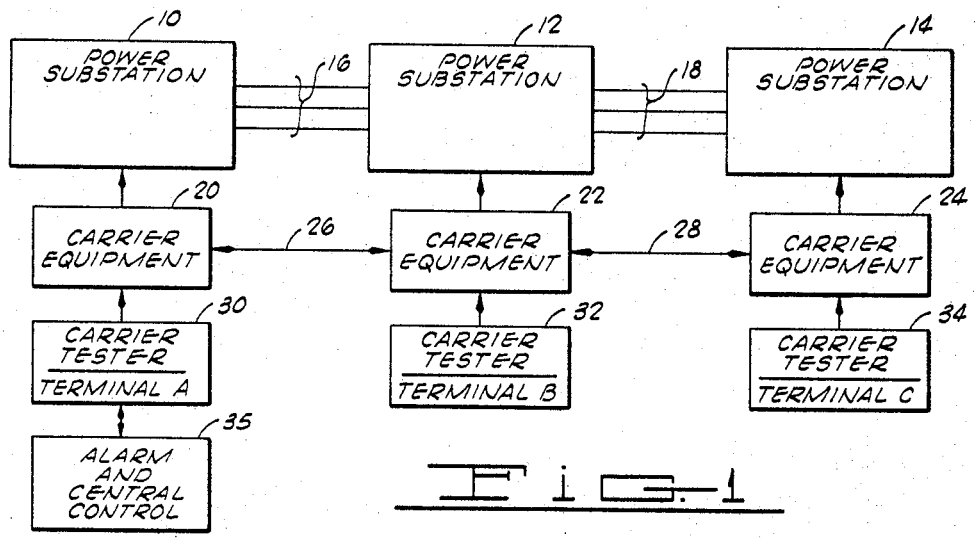
FIG. 1 is an enlarged block diagram of a three-terminal power transmission linkage with attendant carrier and test equipment shown.

FIG. 1 illustrates a typical three-terminal line consisting of the spaced power substations 10, 12 and 14 interlinked by the respective high voltage distribution lines (three-wire) 16 and 18. This is a typical form of power distribution although in many instances a two-terminal linkage or branch may constitute a complete terminal system. Also, typically, the power substations 10, 12 and 14 are provided with an overload protective relay system of well-known pilot-relaying equipment which are designated as carrier equipment 20, 22 and 24 connected to the respective power substations 10, 12 and 14. The carrier equipment 20, 22 and 24, serially interconnected by carrier lines 26 and 28, provide high speed relaying of faults on the particular protected section (three-terminal extent) of power transmission line. In addition, the carrier equipment 20, 22 and 24 may be used to send and receive other data; e.g. telephony, telemetering, supervisory signals, or other pertinent information which is incident to the proper maintenance of the power transmission line.

The subject of the present invention is the automatic carrier testing equipment, carrier testers 30, 32 and 34, which are connected into the respective carrier equipment 20, 22 and 24. Carrier testers 30, 32 and 34 may also be designated as terminals A, B and C, respectively, terminal A being the master terminal and terminals B and C being slaved to its operation. Thus, the carrier testers 30, 32 and 34 will provide automatic and periodic testing of the respective carrier equipment 20, 22 and 24 as will be further described below. An alarm and central control 35 is associated with the terminal A carrier tester 30 and it serves as a supervisory station or system central for the relay carrier tester equipment. It should also be understood that while a three-terminal power transmission line is shown in the FIG. 1 illustration, a two-terminal distribution network utilizing a master tester terminal A and a slaved tester terminal B is utilized in many instances.

Figure 2:
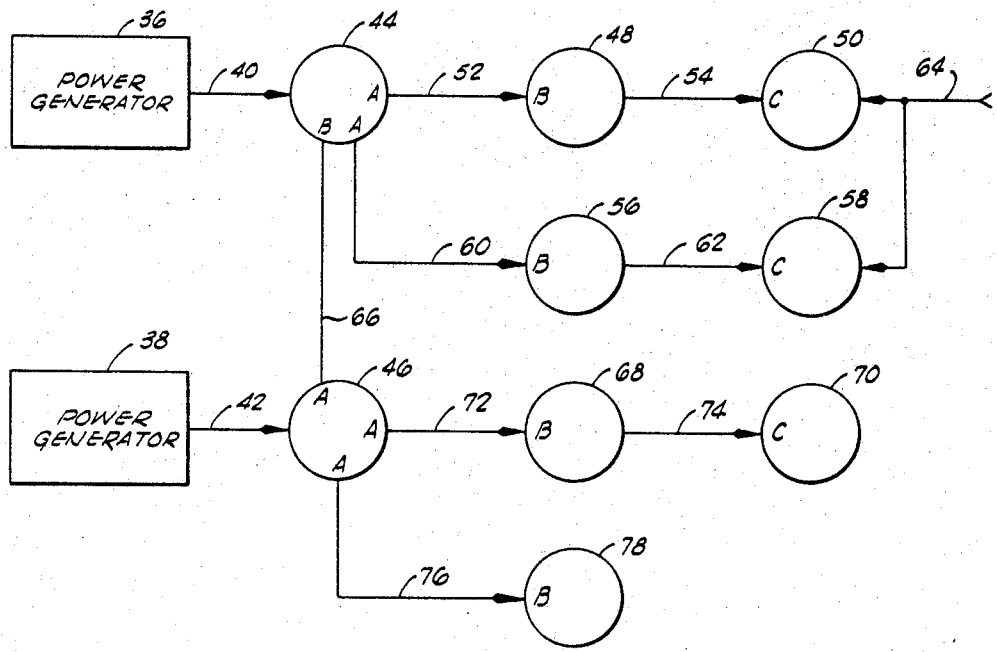
FIG. 2 is one form of electrical power transmission grid which includes various exemplary two- and three-terminal power distribution spans.

FIG. 2 illustrates an exemplary power distribution grid which shows numerous of the possible interconnections of power substations and their associated protective relay equipment. A pair of power generators 36 and 38 serve as primary sources with distribution on lines 40 and 42 to respective substations 44 and 46. Power may be delivered via a first three-terminal network consisting of substations 44, 48 and 50, serially interconnected by distribution lines 52 and 54. A protective relay network for this system (substations 44, 48 and 50) may be installed and carrier tester equipment, terminals A, B and C, may be included as shown by the respective letter designations. Similarly, another three-terminal network wherein substation 44 is provided with a master terminal A relay carrier tester could be extended out through substations 56 and 58 via the interconnecting power distribution lines 60 and 62. The terminal C substations 50 and 58 may, in turn, receive power in from another source on power line 64 whereupon further distribution and protective networks may be connected.

The power substation 46 may supply power via power lines 66 to the substation 44. The overload protection system for this two-terminal network may be installed as designated terminal A at substation 46 and terminal B at substation 44. Terminal 46 might also have another local distribution network of the three-terminal type consisting of outlying substations 68 and 70 serially interconnectd by power lines 72 and 74. Here again, a three-terminal network is provided with a master terminal A and slaved terminals B and C located at the respective substations 46, 68 and 70. It should be noted that the master terminal or terminal A can be placed as a matter of choice in any position of the two- or three-terminal distribution network. Finally, another two-terminal distribution network is shown from a terminal A substation 46 across the transmission lines 76 to a terminal B substation 78.

Referring again to FIG. 1, the carrier equipment 20, 22 and 24, connected in a three-terminal array to power substations 10, 12 and 14, respectively, serve to employ their carrier-current signals to prevent the operation of protective circuit breakers within the terminal network when faults occur outside of the protected area. Thus, during normal operation of the system there is no transmission of carrier. During short-circuit conditions or disturbances to the power system within the three-terminal network, the direction of flow of fault current may be checked by directional relays at each end of a protected line section and the carrier equipment will function accordingly.

If the direction is into one end of the terminal network or into terminal A, and out at the other end terminal C (in the case of a three-terminal network), it will be detected that the fault lies beyond the protected three-terminal section, and carrier current is utilized to send blocking signals from the terminal C substation to the terminal A substation to prevent tripping of the protective relays. If the fault is determined to be internal, between terminal A and a terminal B or C, both respective carrier equipment transmitters will be turned off thereby permitting the protective relays to trip.

The automatic relay carrier testers of the present invention consist of program switch units which can be connected into the respective carrier equipment at the various power substations or terminal points for the purpose of effecting automatic, periodic testing of the carrier equipment so that the numerous carrier equipment can be maintained operative at all times. The automatic relay carrier tester enables such periodic testing with alarm notification and/or recording at a central terminal point without requiring operating personnel. In the case of a two-terminal network, terminal A–B, or a three-terminal network, terminal A–B–C, the A terminal is made the central or supervisory terminal wherein alarm condition may be displayed for any of the terminal points A, B or C in the protective network. The particular situation of the terminal A or master position is a matter of choice depending upon the equipment and personnel facilities at the various terminal points.

Figure 3:
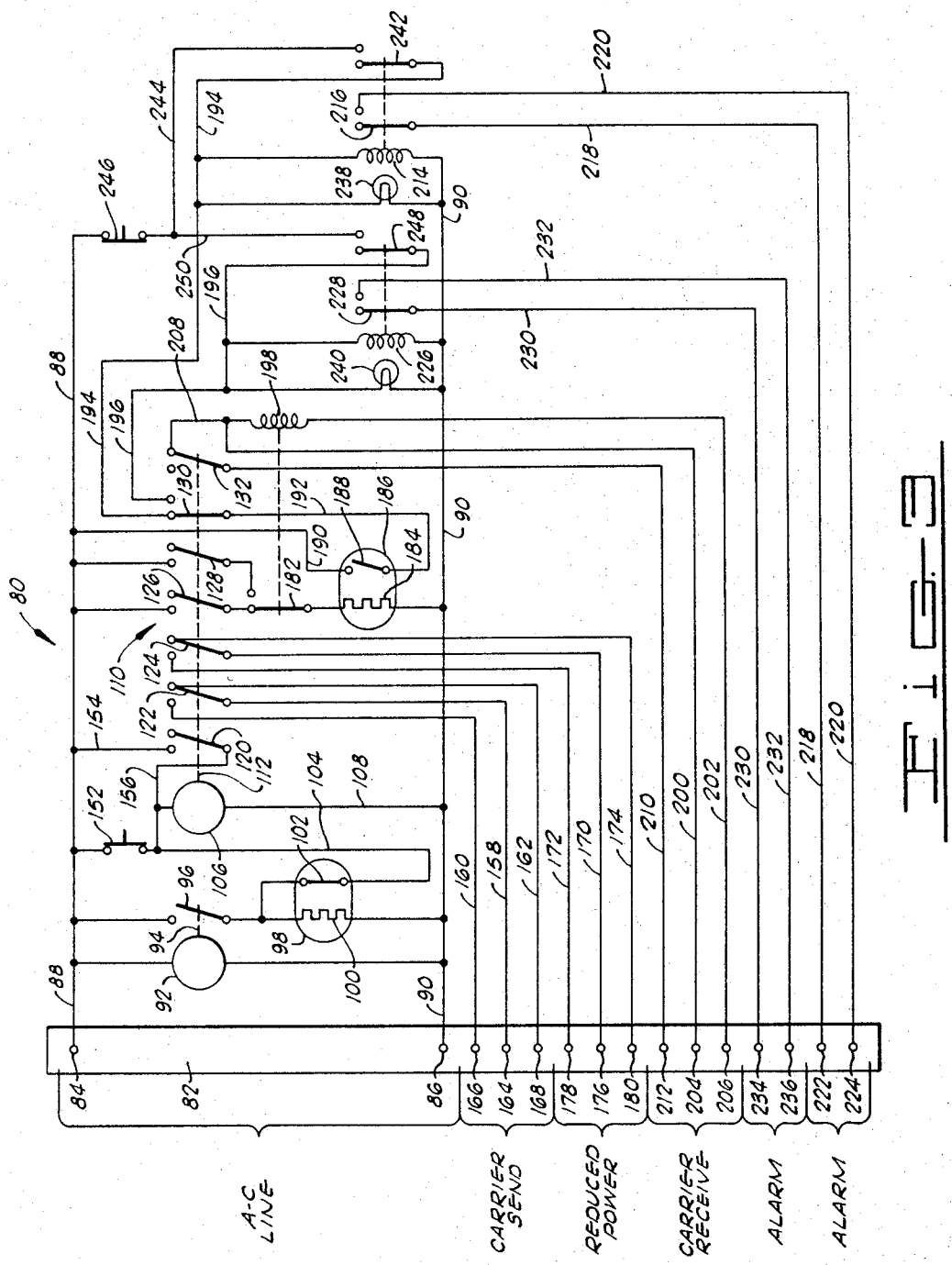
FIG. 3 is a schematic diagram of a master or terminal A relay carrier tester chassis.

Referring now to FIG. 3, a terminal A relay carrier tester 80 is shown in schematic form. It should be noted here that the terminals B and C units are different and will be further described below. The terminal A unit 80 has a terminal board 82 that carries all external connections including the power-in terminals 84 and 86 which supply A-C line voltage between the leads 88 and 90. The A-C line energizing voltage may be derived from any suitable line voltage source in or about the power substation. A synchronous motor 92 is connected across the A-C lines 88 and 90 such that it is continually energized. The motor 92 is a conventional type of synchronous timing motor which includes conventional gearing (not shown) such that a linkage 94 actuates a single contact 96 closed at periodic intervals. It has been designed so that the contacts 96 are closed once in each twenty-four hour period, to remain closed for approximately twenty minutes which is more than sufficient time to conduct a series of carrier tests.

Closure of the switch 96 completes a circuit from the A-C line 88 through a time delay relay 98 to the other side of the A-C line, lead 90. The A-C energization is paralleled through the time delay relay element 100 and its associated switch 102 such that the A-C voltage is present on lead 104 to energize a second synchronous motor 106 since it is connected through lead 108 to the other A-C line 90. The synchronous motor 106 develops very low revolutions per minute and is an integral part of a plural contact program switch 110, interconnection being noted by the dash-line 112. In one preferred form of the motor driven program switch 110, the motor 106 turns at one-fifth revolutions per minute.

Figure 4:
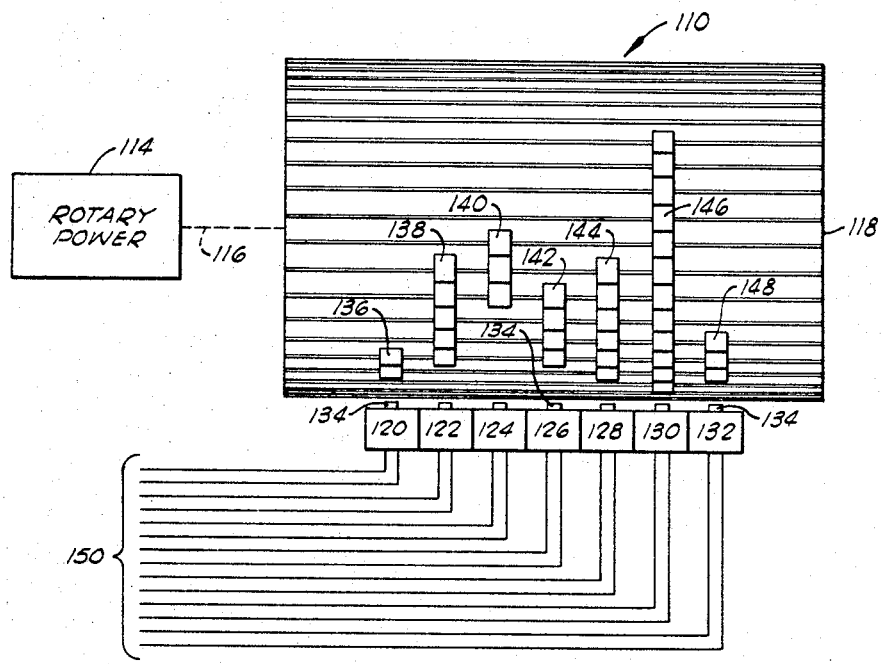
FIG. 4 is an exemplary showing of a suitable type of program switch which is employed in the FIG. 3 tester chassis.

FIG. 4 shows an enlarged, partially schematic diagram of a preferred form of program switch 110. The program switch 110 consists of a suitable source of rotary power 114 and a drive linkage 116 imparting rotary motion to a programming drum 118. A plurality of microswitches 120, 122, 124, 126, 128, 130, and 132 are then held by suitable fastening means side by side and adjacent to the program drum 118 in such a manner that each of the microswitch actuating snubbers 134 can be operated by respective relief areas 136, 138, 140, 142, 144, 146 and 148 which are placed about the program drum 118. The constant turning of the program drum 118 thereby provides varying switch actuation in predetermined, timed relationship, the actuations being present as switch closures and openings on pairs of the plurality of output leads 150 as will be further described.

One form of motor driven program switch 110 which has been employed to good advantage is a form of the "ACTAN" model which is procured from the Sealectro Corporation of Mamaroneck, New York with specific modifications. This program switch embodies a unique design which enables easy variation of the switch program. That is, the program drum 118 is divided into sixty equal, arcuate segments about its circumference, there being a groove between each segment such that plastic spacers or inserts can be slid into the grooves and aligned with particular microswitch actuators to construct a desired relief or switch actuating portion. Thus, any program desired may be set into the program switch simply by adding or removing plastic spacers at given program positions. In the actual equipment, the terminal A units 80 employ a one-fifth revolutions per minute motor such that each segment of the program drum 118 is equal to five seconds in time, this equating three hundred seconds to each complete revolution of the program drum 118.

Referring again to FIG. 3, the synchronous motor 106 of program switch 110 may be energized manually by a test switch 152, this will allow operator testing for use in certain maintenance procedures. Normally, however, the energization of motor 106 is through time delay relay 98, a normally closed ten second time delay relay. That is, the switch contacts 102 will remain closed for ten seconds after energization of the relay element 100, at which time they will open, remaining open as long as power is applied across the time delay relay element 100.

The program switch 110 exercises simultaneous control over the plurality (7) of single pole, double throw switches 120 through 132. The first programmed switch 120 serves to connect leads 154 and 156 to provide a holding contact for energization of the synchronous motor 106 after it receives its initial starting energization through the time delay relay 98. A second programmed switch 122 connects alternatively between a lead 158 and either of leads 160 or 162 to provide carrier send or transmit enablement at the respective terminal points 164, 166 and 168 of terminal board 182. It should be noted that the three terminals 164, 166 and 168 provide either a normally closed or a normally open contact pair and either may be utilized according to the type of carrier send actuation which is employed in the associated carrier equipment. Both the make and break contacting arrangements are found in the various well-known types of carrier equipment.

A third programmed switch 124, the reduced power contacts, also provides the optional make or break circuits between the common lead 170 and either the normally open lead 172 or the normally closed lead 174. These connections can be made to external carrier equipment by means of the respective terminals 176, 178 and 180 on terminal board 82.

Program switch contacts 126, normally open, can be energized to provide A-C energization through relay contact 182 (normally closed) in its de-actuated position, through the element 184 of a normally open, five-second time delay relay 186. Thus, after a five-second energization the contacts 188 are closed to provide A-C conduction between leads 190 and 192 to the common pole of the program switch section 130. Then, in accordance with the position of the programmed drum of program switch 110, A-C energization will be present on either of leads 194 or 196 which provide alarm energization as will be further described.

The relay contacts 182 are controlled by a "Carrier Receive" relay 198 which is connected across leads 200 and 202 from terminals 204 and 206 of terminal board 82. Thus, the receipt of carrier energy (either 48 or 125 volts D-C as is common practice) energizes the "Carrier Receive" relay 198 to actuate the relay contacts 182 to the other position wherein A-C energization is dependent upon programmed actuation of program switch section 128, the receive alarm section.

The program switch section 132 can be actuated to break a circuit extending from lead 208, connected to a point having carrier voltage, through a lead 210 to terminal point 212 of terminal board 82. The lead 210 provides an automatic bell-actuation in response to the presence of received carrier energy as will be further described. Also, major and minor alarms are energized in accordance with the position of program switch section 130. That is, with switch section 130 in the position as shown, A-C energization is present on lead 194 through a "Major Alarm" relay 214 with return to A-C lead 90 to thereby energize the normally opened relay contacts 216 to close the circuit between leads 218 and 220 as contacted externally at terminals 222 and 224, respectively.

Similarly, with program switch section 130 in its other position, lead 196 provides A-C energization of a "Minor Alarm" relay 226 to close relay contacts 228 between leads 230 and 232, and this provides a switch closure indication between the alarm terminals 234 and 236 at the terminal board 82.

A red alarm lamp 238 and an amber alarm lamp 240 are connected in parallel with the respective alarm relay coils 214 and 226 to be energized simultaneously therewith. Also, the major and minor alarm relays 214 and 226 include a second set of relay contacts for holding and reset enablement. The "Major Alarm" relay 214 also energizes relay contacts 242 closed so that A-C holding power, present on lead 244 through normally closed reset switch 246, is applied across relay 214. Similarly, the "Minor Alarm" relay 226 employs the normally open relay contacts 248 as a holding contact such that A-C energization can be conducted via lead 250 from reset switch 246. Hence, reset switch 246 can be depressed to cease conduction of A-C energy through either of the holding contacts 242 or 248 of alarm relays 214 or 226 to cancel the respective alarm indications. It should be restated here that the time delay relay 186 is a five-second time delay, holding contacts 242 and 248 serving to extend energization of relays 214 and 226 after the lapse of the time delay.

Figure 5:
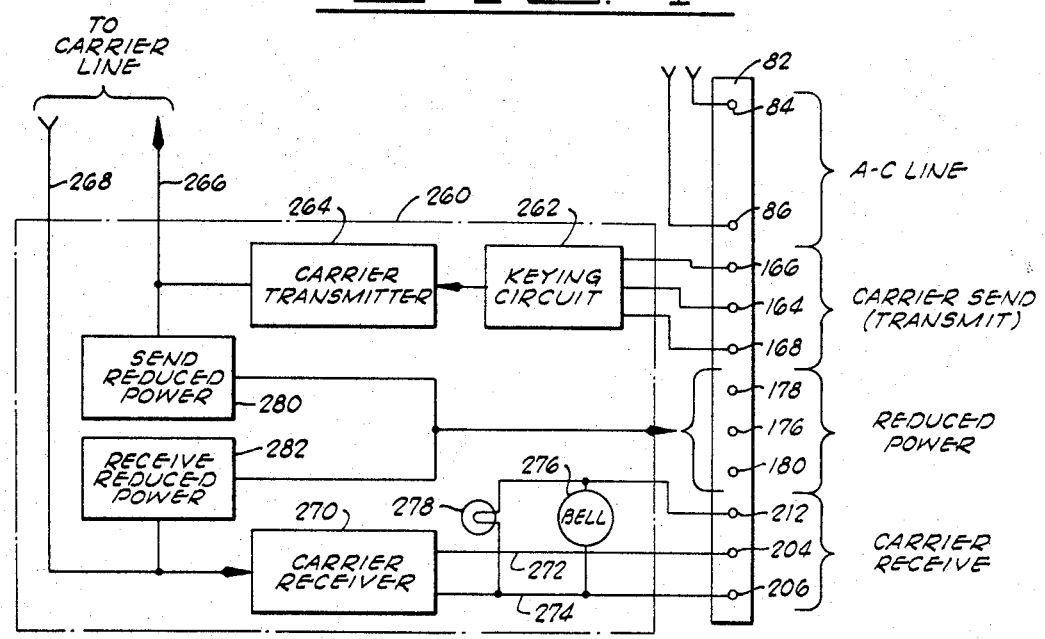
FIG. 5 is a block diagram of typical external interconnecting equipment which may be employed with the tester chassis.

FIG. 5 illustrates the manner in which an automatic relay carrier tester unit, such as that of FIG. 3, might be connected into a typical, commercially available protective-relay carrier equipment 260. The connection of FIG. 5 could represent the connection for any of the terminal A, terminal B or terminal C units; however, it should be understood that the terminal A unit would also include four more terminals such as the alarm terminals 222, 224, 234 and 236 (FIG. 3). The carrier equipment 260 may include a conventional form of keying circuit 262 for controlling the carrier transmitter 264. Connection to the proper pair of the carrier send terminals, 164–166 normally open or 164–168 normally closed, will depend upon whether or not the keying circuit 262 is of the make or break type, either of which is well known in the art. When keyed, the carrier transmitter 264 will provide carrier output on line 266 to the carrier line, i.e., a conventional CW carrier voltage of predetermined low frequency. Control carrier currents can also be received in from the carrier line on line 268 to the input of the carrier receiver 270. A received carrier output voltage of either 48 or 125 volts D-C is then present between leads 272 and 274 to the carrier receive terminals 204 and 206 of terminal 82. A bell 276 and/or a warning light 278 are connected at the carrier equipment for energization through terminal 212 of the tester unit terminal board 82, energization being dependent upon receipt of carrier power and the position of carrier switch 132 (FIG. 3) as was previously described.

In most carrier equipment presently in use, it is desirable to employ reserve-signal or reduced power test sensitivities for sleet detection, etc. Such reduced power sensitivity can be obtained either by reducing the transmitter output or by reducing the receiver input, individual calibration of the carrier test equipment providing the proper basis from which relative power variations can be used to derive meaningful results. In FIG. 5, both a send reduced power circuit 280 and a receive reduced power circuit 282 are included as connected to the respective send and receive carrier lines 266 and 268. In actual practice, one or the other types of reduced power attenuation functions would be included, their advantages being about even. Also, the reduced power terminals 176, 178 and 180 provide a make or break option which the installer can exercise in connecting the relay testing equipment to the particular carrier equipment.

FIG. 6 shows a schematic diagram of a relay carrier tester 290 which is the slaved or terminal B (and C, if used) type of unit. It should be understood that in the event of a three-terminal system, the terminal B and C units will be identical electronically, but their programmed switch arrangements will be different as will be described. Also, the same test board and terminal identifying numbers are employed in the terminal B and C units as were employed in FIGS. 3 and 5 for the terminal A unit 80.

The relay carrier tester 290 employs a motor driven program switch 110 which is identical to the switch employed in the terminal A carrier tester unit of FIG. 3, except that the individual ones of the switch sections will be programmed differently. Thus, the individual ones of the single-pole, double-throw switch sections 292, 294, 296, 298, 300, 302, and 304 will be energized in uniquely programmed manner under the control of a synchronous drive motor 306 (compare to rotary power 114 of FIG. 4 and motor 106 of FIG. 3).

A suitable source of A-C line power is applied at terminals 84 and 86 between the energizing leads 308 and 310. In addition to the programmed switch 110, the carrier tester 290 also includes a plurality of control relays. A "Motor Start" or test cycle relay 312 actuates switch sections 312a and 312b. A second relay, the "Carrier Receive" relay 314 controls a plurality of switch sections 314a, 314b, 314c, 314d, 314e and 314f. A "Lockout" relay 316 actuates another plurality of single-pole, double-throw switch sections 316a, 316b, 316c, 316d, 316e and 316f while an "Alarm" relay 318 controls a pair of relay contact sections 318a and 318b.

The operation of the slaved relay carrier tester 290 depends upon the prior operation and controlled keying of the associated terminal A unit. That is, when carrier is received across terminals 214 and 216 on leads 320 and 322 to energize the "Carrier Receive" relay 314, A-C energization is conducted through relay contact 312b and the actuated closed relay contact 314e and through a parallel branch consisting of relay contact 316f and parallel lead 324 to energize the respective elements 326 and 328 of time delay relays 330 and 332. The time delay relay 330 is a normally open, thirty-second time delay while the time delay relay 332 is a normally open, five second time delay.

The time delay relays 330 and 332 provide circuitry wherein a security code test may be effected as will be further described below. The relay contacts 334 close thirty seconds after energization of the element 326 to provide a connection between the A-C lead 310 and switch section 314f to energize the "Motor Start" relay 312. The relay contacts 336 which exhibit a five-second delay provide a connection from the relay section 314d to a lead 338 which is connected to one side of the "Lockout" relay 316, the other side being returned to the A-C lead 310 via lead 340.

Thus, after a portion of the prescribed security code test is met (to be described), and contacts 334 of time delay relay 330 are closed, and the "Carrier Receive" relay 314 is de-energized, the motor start relay 312 is energized and contacts 312 are actuated closed to provide A-C energization on the lead 342 through the program switch drive motor 306 and lead 344 to the underside of the A-C line on lead 310.

The start of rotation of the program switch motor 306 closes the program switch contact 292 which provides holding energization via leads 346 and 348 to maintain relay 312 energized. The program switch is so arranged that the program switch contacts 292 will remain closed for one complete cycle of the program switch 110. Thus, after the security code requirements have been met, the program switches of all three terminals (terminals A, B and C) will be running in synchronization. It should be noted that the program switch at terminal A will always be a predetermined number of positions ahead of the program switches at terminals B and C, the number of positions depending upon the particular security code test which is adjusted into the system.

A time delay relay 350 also enters into the security test sequence. The element 352 of time delay relay 350 is connected between one side of the A-C line 310 and a lead 354 which lead to normally closed relay contacts 314c and normally open relay contacts 314b. Hence, when "Carrier Receive" relay 314 is energized, conduction will be from the A-C line 308 through normally closed lockout contacts 294 of program switch 110 and through the relay contacts 314b to energize the time delay relay 350, a normally open five-second delay. After the five seconds the time delay relay contacts 356 are closed for energization via lead 338, lockout relay 316 and lead 340. Time delay relay 358, another normally open, five-second delay, is connected to have its heating or energizing element 360 connected between the A-C line 310 and the normally closed "Carrier Receive" relay contacts 314a and normally open program switch contacts 296 to the other side of the A-C supply, lead 308. The contacts 362 of time delay relay 358 are connected to complete a circuit from A-C lead 310 through the "Alarm" relay 318 and lead 366 to the relay contacts 316d, which contacts eventually connect via lead 368 to the other side of the A-C line on lead 338. A pair of normally open relay contacts 318b serve as holding contacts via leads 370 and 372 to maintain the "Alarm" relay 318 energized even after the time delay relay 358 is deactuated.

Another of the programmed switch contacts 298 functions to enable sending of carrier upon actuation. Thus, a lead 374 from terminal 166 is connected to the normally open contact of switch contacts 298 while the common pole is connected via a lead 376 to the common terminal connection 164 at terminal board 82. The normally closed contact of program switch contacts 298 is connected via a jumper lead 378 and lead 380 to a normally closed contact of relay contacts 318a and then via lead 382 to the terminal 168. Thus, the normally closed position is between the common lead 376 and lead 382; however, actuation of the "Alarm" relay 318 bypasses conduction on lead 384 such that actuation of the "Lockout" relay 316 completes a circuit through lead 376, and an alarm circuit is completed through program switch contacts 300 and 298 to the common lead 376 when the program switch contacts are in their normal or de-actuated positions.

The reduced power test is carried out via the leads 386, 388 and 390. Lead 386 is connected through "Lockout" relay contacts 316b (normally closed) and via lead 392 to the normally open position of the program switch contacts 302. The normally closed position of contacts 302, connected to lead 388, are also connected via lead 394 to the pole of contacts 316a, the normally open position of contacts 316a being connected to output lead 390 and via a lead 396 to the pole of the program switch contacts 302. Also, a "stop bell" electrical indication is provided by means of program switch contacts 304 which, when actuated, break the circuit between carrier receive lead 320 and a lead 398 to terminal point 212.

OPERATION

The automatic relay carrier tester operates through respective carrier equipment, transmitter and receiver, to test that each terminal can send and receive carrier with the remaining two terminals on both full and reduced power. Failure to receive carrier at all of terminals A, B and C during the full power test results in a Major Alarm and a red light indication at the terminal A or supervisory station. Failure to receive carrier at all terminals during the reduced power or sensitivity portion of the test will result in a Minor Alarm and an amber light indication.

FIG. 7 shows a graph of an exemplary form of program which might be adjusted into the atuomatic relay carrier tester equipment as shown in FIGS. 3 and 6. FIG. 7 shows the program arrangement for a three-terminal system which is designed to utilize received reduced power test (as opposed to send reduced power). FIG. 7 depicts the energization of the program switches in each of terminals A, B and C of such a three-terminal system, the graph including a seventy-two segment length in keeping with an exemplary and popular form of program. That is, the program switch terminal A carries out its complete sixty segments (five-seconds per segment) of program traverse and terminals B and C, being energized twelve segments later than terminal A, carry out their respectively sixty segments of program traverse. Thus, a complete carrier system test cycle is completed in 360 seconds, 300 seconds of programming time actually being used. The interaction of relay and program switch contacts to carry out the test functions will be apparent from the following description of FIGS. 3 and 6 operating under the switching program of FIG. 7.

Upon initiation of the test at terminal A, it is desirable to first carry out a security code test. This will prevent false energizations due to telephone conversations, telemetering or other interference that might send a long pulse of carrier since it would fail to meet whatever the prescribed security code test. In the event that a faulty initiation of terminal A is instituted, terminals B and C would fail to receive a security code of proper sequence and function and they would then energize the lockout circuitry such that the testers would be prevented from turning carrier on, reducing power, or in any way affecting the normal operation of the respective carrier sets.

The test sequence is initiated at terminal A (FIG. 3) when either the manual test switch 152 or the mechanized twenty-four hour automatic switch 96 is closed to energize the synchronous motor 106 which drives the program switch 110. The closure of automatic time switch 96 energizes time delay relay 98 such that a ten-second energization is provided through relay contacts 102 and lead 104 to the motor 106 and, thereafter, time delay relay contacts 102 open and remain so as long as switch 96 is closed and applying energy through the element 100. This prevents the test from repeating such that only one automatic test cycle will be run in each twenty-four hour period. This, of course, can be varied in any manner as determined by the exigencies of the situation and the test frequency desired.

Upon first actuation of synchronous motor 106, and within the time delay of time delay relay contacts 102, the program switch contacts 120 will be closed to maintain energization of the motor 106 throughout one complete test cycle. At the end of the sixty segment or three-hundred-second cycle, the program switch contacts 120 will again open or revert to the normal position, thus stopping the drive motor 106 until re-energized for the next succeeding automatic test cycle. The line 400 of FIG. 7 shows the programmed state of switch segment 120 of terminal A, being open only through the first five-second segment and closed during the remainder of the programmed switch cycle. Thus, with reference to FIG. 4, and when utilizing the preferred type of rotary program switch, relief means would be provided to hold the associated microswitch closed for all but the initial five seconds of its three hundred-second cycle.

The programmed switched contacts 122 are actuated (either closed or open depending upon the particular carrier equipment) for fifty seconds, as shown by the ten segment bar 402 of FIG. 7, to turn carrier on or to enable transmission at terminal A. This carrier is received at the terminals B and C at the terminal points 204 and 206 such that leads 320 and 322 energize the respective "Carrier Receive" relays 314. This, in turn, closes the relay contacts 314e such that the time delay relays 330 and 332 begin to conduct through the normally closed "Motor Start" relay contact 312b. Thus, if carrier should cease before five seconds, the period before which time delay relay 332 closes its contacts 336, neither terminal if affected. If carrier ceases after five seconds but before thirty seconds, when contacts 334 of time delay 330 are closed, the terminals B and C will lockout due to the fact that the closed contact 336 of time delay relay 332 will provide a conduction path for A-C energy from lead 308 through relay contact 312b and relay contact 314d (carrier having been ceased) to the lead 338 to energize the "Lockout" relay 316 via lead 340 to the A-C lead 310. In this event, energization of the "Lockout" relay 316 opens the contacts 316f through which time delay relay 330 was heating and this prevents the "Motor Start" relay 312 from being energized.

If, however, carrier is received for the full fifty seconds as required by the predetermined security code, the relay contacts 334 of the thirty second time delay relay 330 will have had time to close and A-C energization will be enabled for initiation upon de-energization of "Carrier Receive" relay 314 or upon the ceasing of carrier energy, current flow being through the normally positioned switch 314f to energize the "Motor Start" relay 312. This then closes the "Motor Start" relay contacts 312a to provide A-C energization on lead 342 through the program switch drive motor 306 and lead 344 to the other side of the A-C line, lead 310. This energization of the program switch drive motor 306 will have taken place in both of terminals B and C to begin their respective tests cycles. And, in a manner similar to that for terminal A, programmed switch contacts 292 will be closed after the lapse of an initial segment or five seconds of programmed time to provide continual bypass energization via leads 346 and 348 to maintain the "Motor Start" relay 312 actuated to energize the program switch motor 306 for one complete cycle. The program bars 404 and 406 (contacts 292, terminals B and C) of FIG. 7 would represent such energization. The program switches of terminals A, B and C would now be running in synchronization.

A still further extension of the security code is effected by turning the carrier off at terminal A for thirty seconds after the initial fifty second burst and then re-energizing the carrier output for an additional fifteen seconds. This is represented by the void 408 and fifteen second bar 410 of FIG. 7. Thus, all terminal A carrier is off for thirty seconds during the void period 408 and if either terminal B or C receives carrier during this period the security code test will have failed and the respective normally open, five-second time delay relays 350 of terminals B and C will heat through the lockout contacts 294 (in their normal position) of program switches 110 and the energized position of relay contacts 314b ("Carrier Receive") causing energization of the respective "Lockout" relays 316 for the remainder of the test cycle. In proper operation, and during the fifteen second carrier energization from terminal A (bar 410 of FIG. 7) the respective program switch contacts 294 of terminals B and C are also energized as shown by bars 412 and 414 such that the security code test will be properly completed and the test programs of the terminals will continue to run and complete the carrier relay tests. Thus, lockout can also occur during the program bar 410 period if carrier is not properly received at terminals B and C. In this event, the time delay relay 350 will heat and cause energization of the "Lockout" relay 316 and lockout of the equipment for the remainder of the program switch cycle.

First, as to the full power test, it may be assumed that since terminals B and C started, they were able to successfully receive full power carrier from terminal A. In the event of no reception, their respective program switches will not be energized and a major alarm will be transmitted in the form of no carrier to terminal A during the terminal A "Carrier Receive" portion of the test. That is, the program bar portion 416 of terminal A which closes the program switch contacts 126 for six segments, from 105 to 135 seconds of program time, requires a carrier input for normal reaction. At the 105 second segment the terminal B contacts 298 are closed while the terminal C contacts 296 are closed. These terminal B and C program closures are for fifteen seconds each as shown by the program bars 418 and 420. Thus, if carrier is not received at terminal A, a circuit through program switch contacts 126 and the de-energized relay contacts 182 will cause the time delay relay 186 to heat up and close its relay contacts 188. This energizes an A-C circuit from lead 190 through lead 192 and program switch section 130 and lead 194 to energize the "Major Alarm" relay 214 while energizing the red lamp 238 (which indicates a major alarm). Also, the normally open contacts 216 (terminal A) complete a circuit between leads 218 and 220 to the alarm terminals 222 and 224 for the purpose of sending a remote major alarm to a suitable central or supervisory location. This alarm will then hold until reset by the manual reset push button switch 246 which breaks the A-C holding power through the relay contacts 242 of the alarm relay 214.

If this same carrier as transmitted from terminal B (energization to be noted by the program bar 418) was not received at terminal C, the "Carrier Receive" relay 314 is de-energized and program switch contacts 296 are closed (program bar 420) such that the time delay 358 heats up between A-C leads 308 and 310 thereby closing the time delay relay contacts 362. This then energizes the "Alarm" relay 318 closing the time delay relay bypass energization through relay contacts 318b, and opening the relay contacts 318a such that a completed circuit is made from lead 382 through 384, program switch contacts 300 and program switch contacts 298 to the return lead 376 such that the carrier send circuitry can be energized. Thus, the alarm will be transmitted to terminal A during the ensuing alarm portion of the test (to be described) in the form of carrier to terminal A.

In similar manner, terminals A and B can then check to see that carrier is received from terminal C. That is, the next succeeding three segments of program time are switched as between terminals B and C. The carrier receive program switch contacts 296 of terminal B are energized as shown by program bar 422 and the carrier send program switch contacts 298 of terminal C are energized as denoted by the segment bar 424. Thus, with contacts 126 of terminal A (bar 416) still enabling carrier transmission, the circuitry functions to detect carrier transmitted from terminal C at each of terminals A and B, failure of which results in enabling a major alarm.

At segment positions 28 of the terminal A and 16 of the terminal B and C programs, as noted by the arrow 426, all carrier is off. Actuation at the next program segment then enables a sending of carrier indicative of a full power alarm in the event that a major alarm should follow. Thus, for the next three program segments, the receive alarm program switch 128 of terminal A and the respective send alarm contacts 300 of terminals B and C are actuated as shown by the program bars 428, 430 and 432. Thus, if the respective "Alarm" relay 318 was previously pulled in and is presently holding in either of terminal B or C, they will send an alarm in the form of carrier. At terminal A, if carrier is received to energize the carrier receive relay 198, a circuit is completed through program switch 128 and relay contacts 182 to cause the time delay relay 186 to heat and apply A-C energy through time delay relay contacts 188, lead 192, program switch 130 and lead 194 to energize the alarm relay 214 and red light 238. Thus, the circuit action is the same as if terminal A had failed to receive the terminals B or C. After the alarm interval, all carrier stops for the segment denoted by the arow 434 in FIG. 7. The next sequence of tests deal with the reserve-signal or reduced power testing, as employed for sleet detection, etc., and the sending of reduced power alarms or what is termed herein as the minor alarm. In order to perform the reduced power test, each of the terminals A, B and C is actuated to reduce the sensitivity of its respective receivers. Keep in mind that this is the case as selected to illustrate the program of FIG. 7, that of received reduced power as opposed to other alternatives wherein the reduced power variation would be interjected at the sending equipment. This is a conventional alternative, selection and adjustment of which is well within the scope of the skilled artisan.

Thus, the one hundred fifty-second program bars 436, 438 and 440 actuating the respective program switch contacts 124, and 302 of terminals A, B and C, serve to effect the reduced power actuation. This merely provides a switch indication to the associated carrier equipment wherein the selected attenuation or power reducing circuitry is switched into operation. Thus, in the selected illustration wherein reduced power is received, the program bars 436, 438 and 440 denote switch actuations wherein the sensitivity of the respective carrier receivers is reduced.

In this case, a fifteen-second program bar 442 is actuated at the forty-fourth segment to reverse program switch 122 at terminal A such that carrier is sent from its respective carrier equipment. If this carrier is not received at terminals B and C, their respective time delay relays 358 will heat and pull in to close the time delay relay contact 362 due to the fact that the respective program switches 296 of terminals B and C are closed as per program bars 444 and 446. The closing of time delay relay contact 362 then pulls in the alarm relay 318 and it locks in due to the holding action of its relay contacts 318b. The terminal B then sends carrier with actuation or program switch contacts 298 as per program bar 448 of FIG. 7 and terminal C continues to check for carrier presence with the program switch 296 actuated as per program bar 446 (FIG. 7). Also, the carrier receive program switch 126 of terminal A is actuated closed as per the program bar 450. If, during this period, terminal A receives no carrier, the time delay relay 184 heats up to close its time delay relay contacts 188, thus energizing lead 192 through program switch contacts 130 which is now actuated as per program bar 452 such that A-C energy is conducted via lead 196 to energize the "Minor Alarm" relay 226 and its associated alarm system, including an amber alarm indicator 240. Also, actuation of the minor alarm relay 226 causes the relay contacts 228 to provide a switch indication between leads 230 and 232 for conduction to a remote supervisory position. The minor alarm relay 226 will then lock in, due to the holding action of its relay contacts 248, until manually reset by the push button switch 246.

At the position of the twenty-eighth program segment of terminal C, shown by the arrow 454, the program switch 298 is actuated for three segments or fifteen seconds as shown by the program bar 456 to send carrier. Simultaneously, the terminal B unit is controlled via actuation of the program switch contacts 296 for the program duration 458 to receive carrier. Noting the program bar 450 of terminal A, the program contacts 126 remain actuated to receive carrier. If carrier is not received at terminal A the reduced power alarm relay is actuated in a manner similar to the preceding terminal B check. Also, if no carrier is received by terminal B, the time delay relay 358 will heat through the closed program switch contacts 296 to close the time delay relay contacts 362. This in turn actuates the "Alarm" relay 318 such that it locks in and will then transmit a minor alarm signal to terminal A during the alarm portion of the test which will be actuated at a subsequent time.

No carrier is sent on the program position or segment 28, shown at arrow 458, for its duration of five seconds. The respective send alarm switch mechanisms will then effect such if the previous conditions of their respective alarm relays should warrant. That is, the program switch contacts 128 of terminal A are actuated as shown by the program bar portion 460 and, simultaneously, program bar portions 462 and 464 indicate that the respective send alarm program switch contacts 300 of terminals B and C are energized for a similar period. At terminals B and C, carrier will be sent upon actuation of respective contacts 300 if either of their "Alarm" relays 318 had been previously locked in. At terminal A, the alarm carrier will effect the closing of the reduced power or "Minor Alarm" relay 226. All carrier then stops and the three program switches 110 of terminals A, B and C will continue to cycle to their respective sixtieth segment positions whereupon the respective program switch contacts 120 (terminal A) and 292 (terminals B and C) will open to stop the program switch drive motors 106 and 306, respectively.

In some cases, it may be desirable to include a counter at the terminal A or supervisory position such that a record can be kept of the number of tests performed. This can be checked periodically to insure that the equipment is functioning properly. Various other installation and check-up procedures which are common knowledge to the skilled maintenance man may be included in the installation of the relay carrier tester equipment.

Further, as it was previously stated, the programs of the various units, either two or three terminal units, may be altered in various ways so that the relay carrier tester equipment can function to perform several modes of operation. That is, the sequence and duration of testing may be varied as well as the program bar provisions for the reduced power operation, i.e., whether the equipment are the reduced power "send" or "receive" types.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. Automatic relay carrier testing apparatus for use with protective relay systems for high voltage transmission lines, which systems include a carrier-current transmitter and receiver interconnected between each transmission line terminal point, comprising:
   control means at each terminal connected to energize the respective transmitter;
   first program switch means providing a plurality of first control outputs to a first one of said control means;
   first drive means connected to actuate said first program switch means through a predetermined program to provide a desired sequence of control outputs;
   means for energizing said first drive means only during spaced intervals;
   second program switch means providing a plurality of second control outputs to a second one of said control means;
   second drive means connected to actuate said second program switch means through a predetermined program to provide a desired sequence of control outputs;
   means controlled by actuation of said first program switch means for energizing said second drive means to function in synchronism with said first drive means;
   whereby said first and second control outputs energize their respective transmitters in a predetermined order to verify the operation of the carrier-current equipment.

2. Automatic relay carrier testing apparatus as set forth in claim 1 which is further characterized to include:
   third program switch means providing a plurality of third control outputs to a third one of said control means;
   third drive means connected to actuate said third program switch means through a predetermined program to provide a desired sequence of control outputs;
   second means controlled by actuation of said first program switch means for energizing said third drive means to function in synchronism with said first drive means.

3. Automatic relay carrier testing apparatus as set forth in claim 1 wherein said control means each comprise:
   means for keying the transmitter; and
   means for enabling a receiver output in response to reception of carrier.

4. Automatic relay carrier testing apparatus as set forth in claim 3 which is further characterized to include:
   means connected to the carrier-current transmitter and receiver for effecting reduced power carrier test; and
   means included in said control means for enabling said reduced power test in response to respective control outputs.

5. Automatic relay carrier testing apparatus as set forth in claim 1 wherein said first and second program switch means each comprise:
   rotary drum means having a plurality of circumferential relief portions thereon, said relief portions being varied in arcuate length in accordance with the predetermined programs; and
   a plurality of microswitches aligned by each of said relief portions to be actuated thereby.

6. Automatic relay carrier testing apparatus as set forth in claim 1 wherein said first and seocnd drive means comprise:
   A-C synchronous motor for generating rotational output; and
   drive linkage means for transferring said rotational output to said drum means.

7. Automatic relay carrier testing apparatus for use with protective relay systems for high voltage transmission lines, which systems include a carrier-current transmitter and receiver interconnected between each transmission line terminal point, comprising:
   first switch means connected to key a first terminal transmitter;
   current responsive means connected to be energized by carrier received at said first terminal point;
   actuation means for controlling said first switch means in accordance with a predetermined program of switch actuation;
   means including a synchronous timing motor and a periodically actuated switch for energizing said actuation means;
   second switch means connected to key the transmitter at said second terminal point;
   second current responsive means energized by carrier received at a second terminal point;
   second actuation means for controlling said second switch means in accordance with a second predetermined program of switch actuation; and
   means including a time delay relay for energizing said second actuation means upon enablement by said second current responsive means for a period required in accordance with a predetermined security code test.

8. Automatic relay carrier testing apparatus as set forth in claim 7 which is further characterized to include:
   third current responsive means energized by carrier received at a third terminal point;
   third switch means connected to key the transmitter at said third terminal point;
   third actuation means for controlling said third switch means in accordance with a third predetermined program of switch actuation; and
   second means including a time delay relay for energizing said third actuation means upon enablement by said third current responsive means for a period required by a predetermined security code test.

9. Automatic relay carrier testing apparatus as set forth in claim 7 which is further characterized to include:
   additional switch means at said first terminal point which is positioned for actuation by said actuation means to enable a reduction in sensitivity at the respective carrier-current transmitter and receiver equipment.

10. Automatic relay carrier testing apparatus as set forth in claim 7 which is further characterized to include:
    means including an alarm circuit located at said second terminal for detecting a fault in the program switching test and enabling an alarm indication.

11. Automatic relay carrier testing apparatus as set forth in claim 8 wherein each of said first, second and third actuation means comprises:
    a rotatable drum assembly having a plurality of circumferential relief portions extending thereabout, each relief portion having its arcuate length and continuity determined in accordance with a predetermined program of switch actuation.

12. Automatic relay carrier testing apparatus for use with protective relay systems for high voltage transmission lines, which systems include a carrier-current transmitter and receiver interconnected between each transmission line terminal point, comprising:
    first switch means connected to key a first terminal transmitter;
    current responsive means connected to be energized by carrier received at said first terminal point;
    first actuation means for controlling said first switch means in accordance with a predetermined program of switch actuation;
    means including a synchronous timing motor for actuating a switch to periodically energize said actuation means;
    second switch means connected to key the transmitter at said second terminal point;
    second current responsive means energized by carrier received at a second terminal point;
    second actuation means for controlling said second switch means in accordance with a second predetermined program of switch actuation;
    means including a time delay relay for energizing said second actuation means upon enablement by said second current responsive means;
    a pair of carrier receive contacts actuated by said first and second actuation means to indicate carrier reception at said first and second terminals in accordance with respective predetermined programs of switch actuation; and
    a pair of carrier send contacts actuated by said first and second actuation means to enable carrier transmission from said first and second terminals in accordance with respective predetermined programs.

13. Automatic relay carrier testing apparatus as set forth in claim 12 which is further characterized to include:
    a pair of reduced power contacts actuated by said first and second actuation means to enable carrier test at reduced sensitivity at each of said first and second terminals in accordance with respective predetermined programs.

14. Automatic relay carrier testing apparatus as set forth in claim 12 which is further characterized to include:
    means actuated by each of said first and second actuation means to enable an alarm indication in the event of a failure in carrier reception and transmission tests at either of the respective first and second terminals.

15. Automatic relay carrier testing apparatus as set forth in claim 12 which is further characterized to include:
    third current responsive means energized by carrier received at a third terminal point;
    third switch means connected to key the transmitter at said third terminal point;
    third actuation means for controlling said third switch means in accordance with a third predetermined program of switch actuation;
    second means including a time delay relay for energizing said third actuation means upon enablement by said third current responsive means;
    a third carrier receive contact actuated by said third actuation means; and
    a third carrier send contact actuated by said third actuation means.

16. Automatic relay carrier testing apparatus as set forth in claim 15 wherein each of said first, second and third actuation means comprises:
    a rotatable drum assembly having a plurality of circumferential relief portions extending thereabout, each relief portion having its arcuate length and continuity determined in accordance with a predetermined program of switch actuation.

References Cited

UNITED STATES PATENTS

| | | | |
|---|---|---|---|
| 2,525,393 | 10/1950 | Blackburn | 317—29 |
| 2,873,410 | 2/1959 | Hodges | 317—28 |
| 3,273,017 | 9/1966 | Mathews | 317—29 |
| 3,311,785 | 3/1967 | Lensner | 317—28 |
| 3,312,866 | 4/1967 | Rockefeller | 317—28 |

JOHN F. COUCH, *Primary Examiner.*

R. V. LUPO, *Assistant Examiner.*